United States Patent
Kagami et al.

(10) Patent No.: US 6,876,789 B2
(45) Date of Patent: Apr. 5, 2005

(54) OPTICAL FILTERING MODULE AND OPTICAL DEVICES USING SUCH OPTICAL FILTERING MODULE

(75) Inventors: Kaoru Kagami, Akishima (JP); Toshihisa Kurosawa, Akishima (JP); Hidekuni Asai, Tokyo (JP); Seiichi Yokoyama, Ome (JP); Yoshiatsu Yokoo, Hidaka (JP)

(73) Assignee: Hoya Corporation, Tokyo (JP)

( * ) Notice: Subject to any disclaimer, the term of this patent is extended or adjusted under 35 U.S.C. 154(b) by 98 days.

(21) Appl. No.: 09/901,307

(22) Filed: Jul. 9, 2001

(65) Prior Publication Data

US 2002/0126955 A1 Sep. 12, 2002

(30) Foreign Application Priority Data

Jul. 10, 2000 (JP) ........................................ 2000-209135
Dec. 28, 2000 (JP) ........................................ 2001-399867

(51) Int. Cl.[7] .................................................. G02B 6/26
(52) U.S. Cl. ...................................................... 385/31
(58) Field of Search .............................. 385/31, 34, 99, 385/137

(56) References Cited

U.S. PATENT DOCUMENTS 5,359,683 A * 10/1994 Pan ............................. 385/22
5,682,452 A * 10/1997 Takahashi ..................... 385/85
6,404,954 B1 * 6/2002 Zhu et al. ...................... 385/34
6,483,982 B1 * 11/2002 Takahashi ..................... 385/140

FOREIGN PATENT DOCUMENTS

| JP | 11-337765 | 12/1999 |
| JP | 2000-056195 | 2/2000 |
| WO | WO 96/19743 | 6/1996 |

* cited by examiner

*Primary Examiner*—Thanh-Tam Le
(74) *Attorney, Agent, or Firm*—Woodard, Emhardt, Moriarty, McNett & Henry LLP

(57) ABSTRACT

There are disclosed an optical filtering module and various optical devices using the filtering module. The optical filtering module has an optical filter for transmitting, attenuating or reflecting light having a certain wavelength range, a first optical system having an optical fiber for guiding light to be transferred to the optical filter, a second optical system having an optical fiber for guiding light transferred from the optical filter, the second optical system being opposingly arranged to the first optical system while interposing the optical filter therebetween and an outer cylindrically shaped glass holder for holding therein the optical filter, the first optical system and the second optical system secured thereto.

13 Claims, 20 Drawing Sheets

OPTICAL FILTERING MODULE AND OPTICAL DEVICES USING SUCH OPTICAL FILTERING MODULE

BACKGROUND OF THE INVENTION

1. Field of the Invention

The present invention relates to an optical filtering module and various optical devices using the filtering module. More particularly, the present invention relates to an optical filtering module including an optical filter, a first optical system for guiding light entering the optical filter, and a second optical system for guiding light exiting the optical filter, as well as various optical devices utilizing such optical filtering module, such as an optical multi/demultiplexer or an optical equalizer.

2. Description of the Related Art

In the optics industry field, an optical filtering module is employed comprising an optical filter for selectively transmitting, attenuating or reflecting light, and an optical system for guiding light to the optical filter or guiding light exiting the filter. Among such optical filtering modules, an optical multi/demultiplexer capable of multiplexing light having different wavelength signals or demultiplexing light into individual different wavelength light signals is well-known, as is an optical equalizer for equalizing light having an uneven intensity/wavelength property into light having a constant intensity/wavelength property.

FIG. 20 shows an optical multi/demultiplexer 90 taken as an example for an optical filtering module. The optical multi/demultiplexer 90 comprises a first collimator 100 having two optical fibers 101, 102, a second collimator 110 having a single optical fiber 111, and a wavelength selection filter 95 disposed between the collimators 100, 110.

The first collimator 100 and the second collimator 110 comprise respective fiber holders 104, 114 made of ceramics for holding the optical fibers therein. The fiber holder 104 of the first collimator 100 is formed with two through holes having a circular cross section and extending in a longitudinal direction. The fiber holder 114 of the second collimator 110 is formed with one through hole having a circular cross section and extending in a longitudinal direction. The optical fibers are held by the holders by being inserted into the through holes and bonded by an adhesive.

The first and second collimators 100, 110 comprise respective rod lenses 103, 112 for collimating and converging light. These rod lenses 103, 112, together with the optical fiber holders 104, 114, are held by respective inner holders 105, 115, which are in turn held by an outer holder 120. These inner and outer holders 105, 115, 120 are made of a metal such as stainless steel, or surface-treated with gold plating. The inner holders 105, 115 are bonded to the outer holder 120 by means such as soldering or YAG welding.

Graded index lenses with a pitch of 0.25 are normally used as the rod lenses 103, 112. The rod lenses 103, 112 and optical fibers are mated at their respective oblique surfaces inclined by 8 degrees and polished and are bonded together by an adhesive 107 coated around the circumference of the mated surfaces.

When demultiplexing light using the optical multi/demultiplexer 90, inputted light transferred through one of optical fibers of the first collimator 100 is collimated by the rod lens 103 and reaches the wavelength selection filter 95. The light with a certain wavelength range is reflected by the wavelength selection filter 95 to pass through the rod lens 103, and exits through the other optical fiber of the first collimator 100. On the other hand, the light transmitted through the wavelength selection filter 95 is then converged by the rod lens 112 of the second collimator 110 and exits through the optical fiber 111.

When multiplexing light using the optical multi/demultiplexer 90, light transferred through the optical fiber 111 is multiplexed with light introduced through one of the optical fibers of the first collimator 100 and exits through the other optical fiber of the first collimator 100.

In the above-described conventional multi/demultiplexer, the outer holder is made of an opaque material such as metal, which creates manufacturing problems because it is difficult to see the inside of the holder. That is, component elements may collide with the holder or other elements and broken when they are inserted into the holder or being fixed to other elements. Also, aligning operation for the element is difficult to reduce the accuracy.

In addition, in the conventional manufacturing process, the inner holder is often fixed by soldering or YAG welding, which requires a surface metalization treatment of the inner holder, resulting in complication of the whole process. Also, the optical elements are heated in those processes and subjected to expansion and shrinkage thereof, resulting in deteriorating the positioning accuracy.

Also, the outer holder made of metal, due to its high thermal expansion coefficient, is likely to expand or shrink depending on the environmental condition, to cause displacement of component elements to decrease efficiency of the device.

The object of the present invention is, therefore, to provide an optical filtering module capable of facilitating an easy alignment of the component elements when manufacturing, and providing a stable tuning characteristics by avoiding displacement and, consequently, a long term use reliability, as well as various optical devices using such an optical filtering module.

SUMMARY OF THE INVENTION

The above object of the present invention can be achieved by an optical filtering module comprising an optical filter for at least one of transmitting, attenuating and reflecting light having a certain wavelength range, a first optical system having an optical fiber for guiding light to be transferred to said optical filter, a second optical system having an optical fiber for guiding light transferred from said optical filter, said second optical system being opposingly arranged to said first optical system while interposing said optical filter therebetween, and an outer cylindrically shaped glass holder for holding therein said optical filter, said first optical system and said second optical system secured thereto.

According to the present invention, because the outer holder is made of a glass, which is transparent, a tuning operation can be performed while observing through those elements to some extent, so that an easy and time saving alignment operation is possible while preventing collision between the component elements. This arrangement also enables adopting of photo-curing resins as adhesives for bonding elements by radiating light from an outer light source through those components. Thus, the bonding operation can be performed in a short time without any heat treatment for the optical components.

In addition, the outer holder is formed from a glass, which has a low thermal expansion coefficient, so that displacement of the component elements due to environmental temperature change can be prevented. Therefore, it can perform filtering of light in a stable manner.

DESCRIPTION OF THE PREFERRED EMBODIMENTS

The present invention will be described in detail by referring to the attached drawings.

Figure 1:
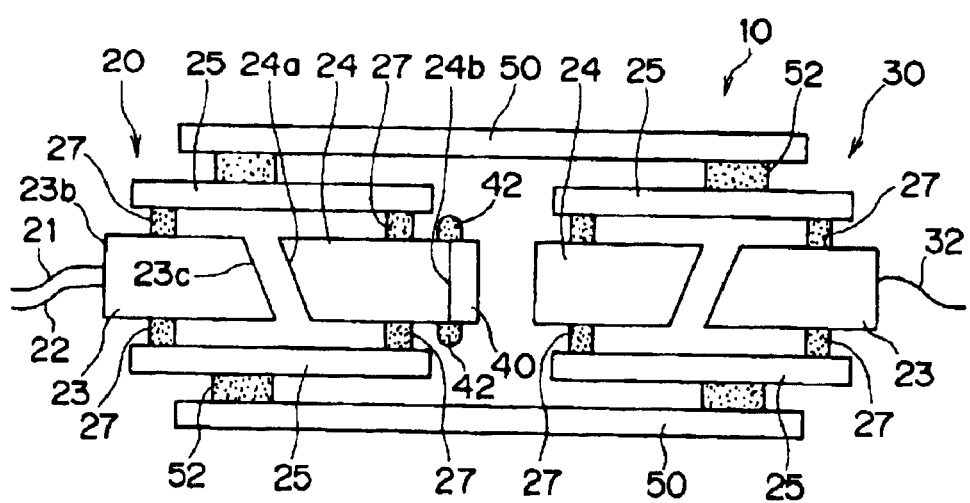
FIG. 1 is a cross-sectional view schematically showing an optical multi/demultiplexer according to the present invention.

FIG. 1 shows an optical multi/demultiplexer 10 as an embodiment of the optical filtering module according to the present invention. The optical multi/demultiplexer 10 is used for demultiplexing admitted optical signals comprising different wavelength light signals into individual wavelength light signals, or conversely, for multiplexing light signals including different wavelengths into a single light signal transferable to a single optical fiber.

The optical multi/demultiplexer 10 comprises a first optical system embodied as a first collimator 20, a second optical system embodied as a second collimator 30 opposingly arranged to the first system 20, a wavelength selection filter 40 disposed between the first and second collimators 20, 30, and an outer holder 50 for holding the first and second collimators 20, 30 therein.

The first collimator 20 comprises a line terminal fiber 21, a reflection terminal fiber 22, a fiber holder 23 for holding the fibers 21, 22, a rod lens 24 disposed in an opposing position to the fiber holder 23, and an inner holder 25 for holding the fiber holder 23 and the rod lens 24.

The line terminal fiber 21 transfers multiplexed light when the device is used for multiplexing, and transfers light to be demultiplexed when the device is used for demultiplexing. Also, the reflection terminal fiber 22 transfers light to be multiplexed when the device is used for multiplexing, and transfers demultiplexed light when the device is used for demultiplexing. Any conventional optical fiber used in the optical communications industry is usable as the optical fibers 21, 22, which is normally a single mode fiber only transmitting single mode light. Various materials can be used for the optical fiber, depending on the application of the device, such as a silica based fiber when transmitting 1.55 $\mu$m waveband light. The reflection terminal fiber 22 is unnecessary when the light from the wave selection filter 40 is not utilized.

Figure 2:
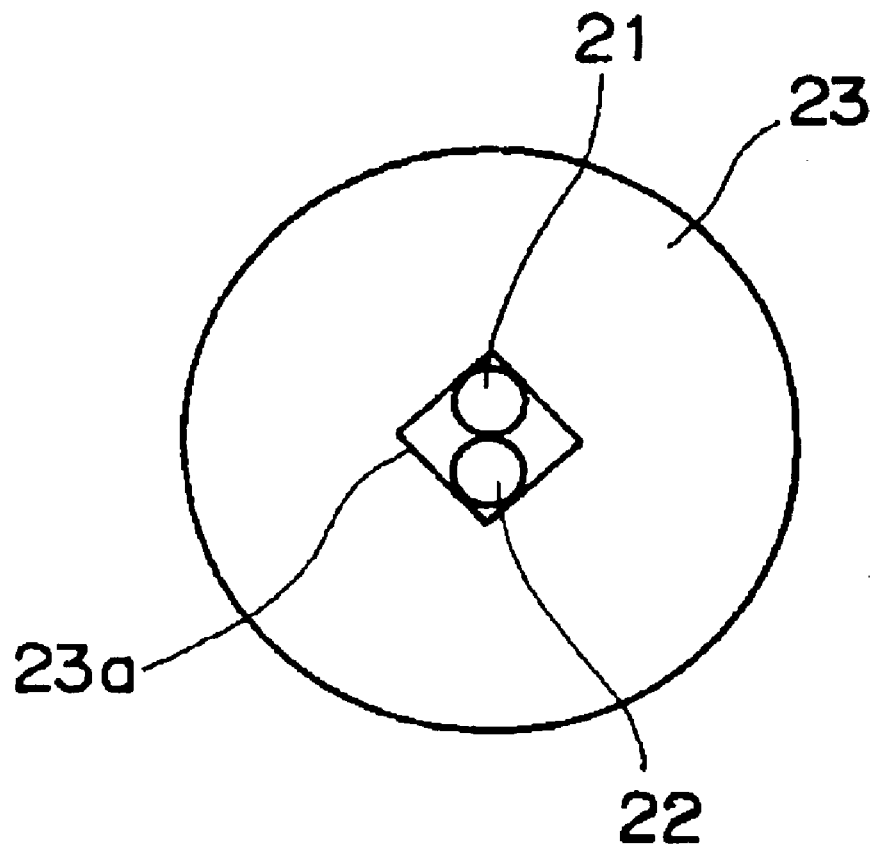
FIG. 2 is a cross-sectional view schematically showing a fiber holder.
Figure 3:
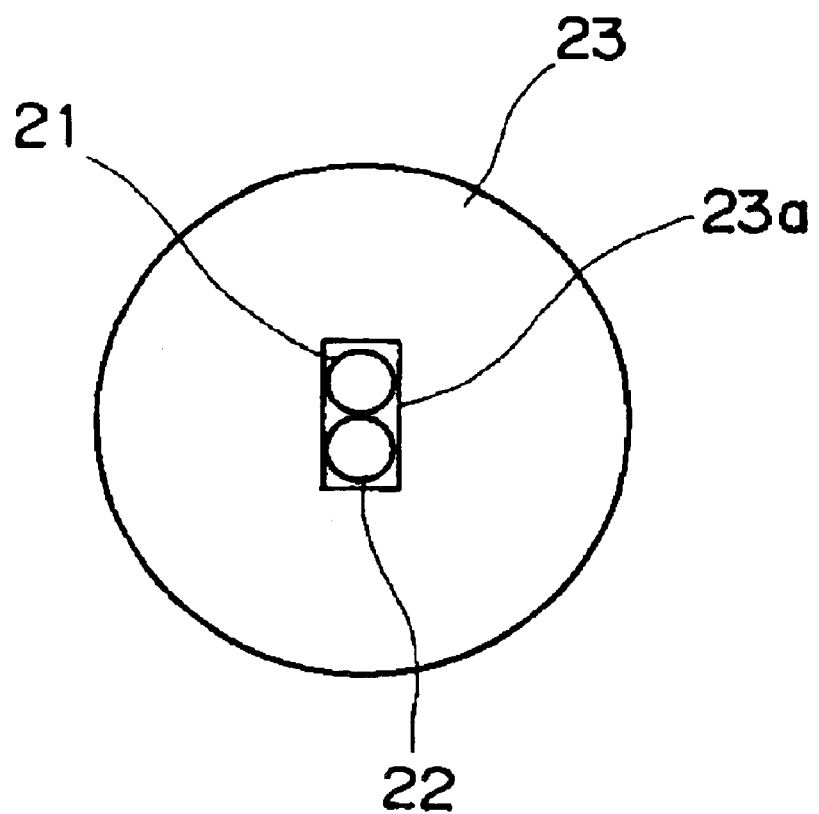
FIG. 3 is a cross-sectional view schematically showing another embodiment of a fiber holder.

The fiber holder 23 is cylinder shaped having a perpendicular surface 23b at one end orthogonal to the optical axis and an oblique surface 23c at the other end inclined by a predetermined angle, e.g., 8 degrees, relative to a plane orthogonal to the optical axis. The fiber holder 23 is formed with a through hole 23a, as shown in FIG. 2 or 3, longitudinally extending along the central axis. The line terminal fiber 21 and reflection terminal fiber 22 are supported by being inserted into the through hole 23a and bonded thereto by a thermosetting adhesive or a photo-curing adhesive such as an ultraviolet-curing adhesive. The through hole 23a may be formed to have a square cross section where two fibers 21, 22 are juxtaposed on a diagonal line, as shown in FIG. 2, or may be formed to have a rectangular cross section where two fibers 21, 22 are juxtaposed along the longer side thereof, as shown in FIG. 3. Such an arrangement facilitates inserting and aligning the fibers 21, 22 into or within the through hole 23a. Also, such an arrangement prevents torsion or displacement of the fibers 21, 22 within the through hole 23a to thereby reduce loss during multiplexing or demultiplexing.

The fiber holder 23 can be made of a glass such as a borosilicate glass, or ceramics such as zirconia. The fiber holder 23 made of a glass enables a worker to directly observe the operation for inserting the fibers 21, 22 into the through hole 23a. This also enables use of a photo-curing type adhesive for securing the fiber by radiating light from an external light source.

Each of the line terminal fiber 21 and the reflection terminal fiber 22 has one end outputted from the perpendicular surface 23b of the fiber holder 23 and the other end flush with the oblique surface 23c of the fiber holder 23.

The rod lens 24 is formed in a cylinder from an optical material such as glass, and has a perpendicular surface 24b orthogonal to the optical axis at one end and an oblique surface 24c inclined by predetermined angle, e.g., 8 degrees, relative to a plane orthogonal to the optical axis at the other end for obtaining a promoted light incident efficiency. The rod lens 24 is preferably provided with an antireflection film on both end surfaces.

By adopting a rod lens 24 having a pitch less than 0.25, multi/demultiplexer can be constructed without making the rod lens 24 contact the fiber holder 23. Such an arrangement prevents collision or displacement of the rod lens 24 and the fiber holder 23 due to thermal expansion or shrinkage of the component elements. This arrangement also permits dispensing with bonding between rod lens 24 and the fiber holder 23 by an adhesive to thereby avoid infiltration of the adhesive into the optical paths. This also facilitate alignment between the rod lens 24 and the fiber holder 23 without depending on the conditions of the oblique surfaces 23c, 24a. Adoption of a rod lens with a pitch not larger than 0.2 will increase the aberration as well as handling difficulty during assembly. Thus, it is preferable to use rod lens 24 having a pitch not less than 0.2 but less than 0.25, and about 0.23 in particular.

The inner holder 25 is a cylindrical member made of a material transparent for visible and ultraviolet rays and having a low thermal expansion coefficient, such as a borosilicate glass including a Pyrex glass, or a silica based glass. The inner holder 25 has an inner diameter slightly larger than the outer diameters of the fiber holder 23 and the rod lens 24. The fiber holder 23 and rod lens 24 are fixed on the inner surface at a certain distance with an adhesive 27.

In the first collimator 20, component elements are arranged so that the inputted light transferred through line terminal fiber 21 reaches the wavelength selection filter 40 through the rod lens 24. A portion of light is reflected by the wavelength selection filter 40 to be introduced to the reflection terminal fiber 22 through the rod lens 24. This also means that the light introduced from the reflection terminal fiber 22 is transferred to the wavelength selection filter 40 through the rod lens 24, and the light reflected by the wavelength selection filter 40 is transferred to the line terminal fiber 21 through the rod lens 24.

The second collimator 30 comprises a transmit terminal fiber 32, which guides light to be multiplexed when the device is used for multiplexing and demultiplexed light when the device is used for demultiplexing, a rod lens 24 opposingly arranged to the fiber holder 23, and an inner holder 25 for holding the fiber holder 23 and the rod lens 24 therein. The second collimator 30 has the same construction as the first collimator 20 except that the fiber holder 23 may have a circular cross section through hole, and the detailed explanation will be omitted.

The wavelength selection filter 40 provided on the perpendicular surface 24b of the rod lens 24 of the first collimator 20 has a selective transmissive property to transmit light of a certain wavelength range and reflect light out of that range. The wavelength selection filter 40 is secured to the perpendicular surface 24b of the rod lens 24 with an adhesive 42 applied on the outer circumference surfaces of the wavelength selection filter 40 and rod lens 24. In order to prevent the adhesive from deeply infiltrating into the gap between the mated surfaces of the rod lens 24 and the wavelength selection filter 40, causing blockage of the optical path, an adhesive with a high viscosity, usually more than 10,000 mPa.s, is used.

As the wavelength selection filter 40, a band-pass filter for transmitting light of a certain wavelength range, a high-pass filter for transmitting light having higher wavelengths than a predetermined threshold, or a low-pass filter for transmitting light having lower wavelengths than a threshold may be used.

A dielectric multilayer filter having high refractive index dielectric layers and low refractive index dielectric layers alternatingly laminated is among the choice for the wavelength selection filter 40. Wavelength selectivity of the wavelength selection filter 40 can be optimized by adjusting number of the layers or by changing the material. An antireflection film is formed on the end surface of the wavelength selection filter 40 opposing the second collimator when necessity.

The outer holder 50 is a cylindrical member made of a material transparent for visible and ultraviolet rays and having a low thermal expansion coefficient, such as a borosilicate glass including a Pyrex glass, or a silica based glass. The outer holder 50 has an inner diameter slightly larger than the outer diameter of the first collimator 20 and the second collimator 30. The first collimator 20 and the second collimator 30 are fixed on the inner surface at a certain distance therefrom with an adhesive 52.

In the above-described optical multi/demultiplexer 10, the first collimator 20, the wavelength selection filter 40 and the second collimator 30 are arranged so that, some portion of the inputted light transferred through the line terminal fiber 21 passes through the wavelength selection filter 40 to be converged to the transmit terminal fiber 32.

Figure 4:
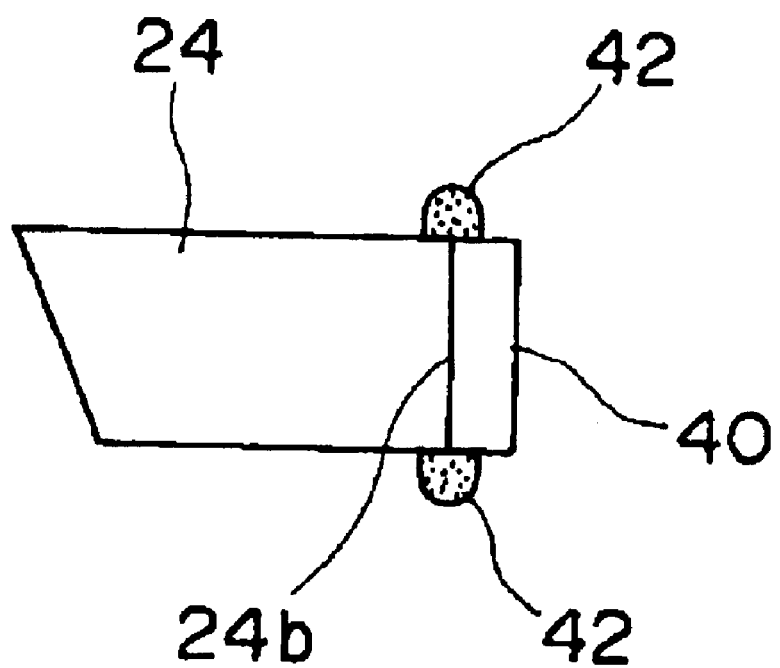
FIG. 4 is a cross-sectional view showing the process for mating the rod lens and the wavelength selection filter.

Next, manufacturing process for the above-described optical multi/demultiplexer 10 will be explained. As shown in FIG. 4, the wavelength selection filter 40 is closely mated to the perpendicular surface 24b of the rod lens 24 on which an antireflection film is formed if necessary, and then the adhesive 42 is coated around the outer surface of these elements to bond them together.

Figure 5:
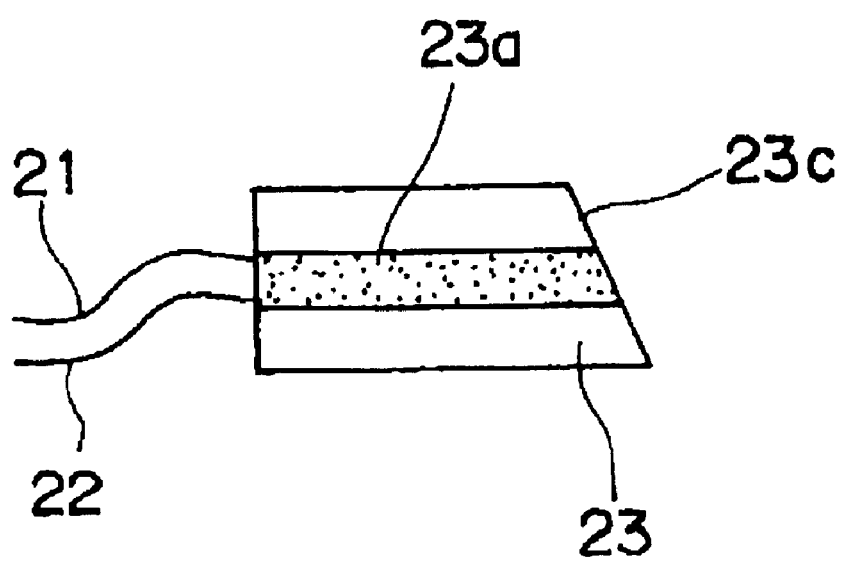
FIG. 5 is a cross-sectional view showing the process for holding an optical fiber by the fiber holder.

On the other hand, as shown in FIG. 5, the line terminal fiber 21 and the reflection terminal fiber 22 are inserted into the through hole 23a of the fiber holder 23. An adhesive is infiltrated into the through hole to be solidified. End surfaces of the fibers 21, 22 on the oblique surface 23c side are polished to be flush with the oblique surface 23c, and is coated with an antireflection film if necessary.

Figure 6:
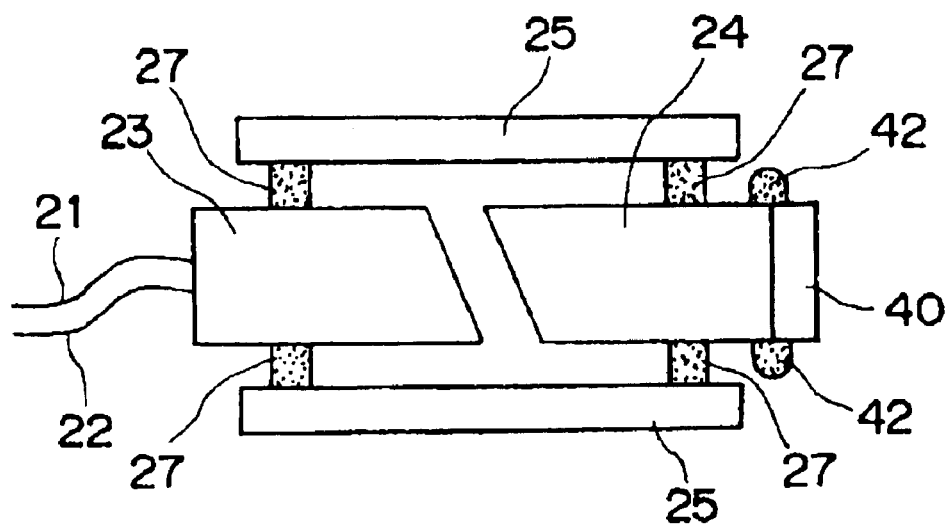
FIG. 6 is a cross-sectional view schematically showing a collimator.

Next, as shown in FIG. 6, the rod lens 24 having the wavelength selection filter 40 attached thereto and the fiber holder 23 are inserted into the inner holder 25. These elements are aligned so that light which is introduced from the line terminal fiber 21 to the wavelength selection filter 40 via the rod lens 24 is reflected by the wavelength selection filter 40 and is further transferred to the reflection terminal fiber 22 through the rod lens 24. The rod lens 24 and the fiber holder 23 are fixed on the inner surface of the inner holder 25 with an adhesive 27 to thereby form the first collimator 20. The second collimator 30 is also manufactured by a similar process.

Then the first collimator 20 and the second collimator 30 are inserted into the outer holder 50. These elements are aligned so that light introduced from the line terminal fiber 21 and passing through the wavelength selection filter 40 is further introduced to the transmit terminal fiber 32 of the second collimator 30. The first and second collimators 20, 30 are fixed on the inner surface of the outer holder 30 with an adhesive 52 to thereby form the optical multi/demultiplexer 10 according to the invention.

In the above-described process, because the fiber holder 23, the inner holder 25 and the outer holder 50 are made of a glass, a tuning operation can be performed while observing through those elements to some extent, so that an easy and time saving alignment operation is possible while preventing collision between the component elements. This arrangement also enables adopting of photo-curing resins as adhesives 27, 52 for bonding elements by radiating light from an outer light source through those components. Thus, the bonding operation can be performed in a short time without any heat treatment for the optical components.

As the photo-curing resins, ultraviolet-curing resins such as epoxy based resins or acrylate based resins may be used. It is preferable to adopt adhesives with a lower curing shrinkage factor, normally less than 4%. The same or different adhesives can be used to different bonding locations.

Next, operation of the above-described optical multi/demultiplexer 10 will be explained. When demultiplexing, the inputted signal light including plural, different wavelength signals is transferred through the line terminal fiber 21 to the optical multi/demultiplexer 10. This signal light is then emitted from the terminal end of the line terminal fiber 21 at the oblique surface 23c of the fiber holder 23, collimated by the rod lens 24, and is guided to the wavelength selection filter 40. From wavelengths of the signal light, a first portion of light having a certain range of wavelength passes through the wavelength selection filter 40. This portion is then transferred to the rod lens 24 of the second collimator 30 to be converged, and exits through the transmit terminal fiber 32 held by the fiber holder 23.

The other portion of light from among the signal light transferred to the wavelength selection filter 40 having wavelengths other than the first portion is reflected by the wavelength selection filter 40, which is then converged by the rod lens 24 of the first collimator 20 and exits through the reflection terminal fiber 22 held by the fiber holder 23.

When multiplexing, respective signal light guided through the reflection terminal fiber 22 and the transmit terminal fiber 32 are transferred to the optical multi/demultiplexer 10. The signal light introduced from the reflection terminal fiber 22 is emitted from the terminal end of the line terminal fiber 21 at the oblique surface 23c of the fiber holder 23, and is collimated by the rod lens 24. The collimated light is transferred to the wavelength selection filter 40. Among the collimated light, a portion is reflected by the wavelength selection filter 40 and is converged by the rod lens 24, which is transferred to the line terminal fiber 21 held by the fiber holder 23.

On the other hand, signal light introduced from the transmit terminal fiber 32 is emitted from the terminal end of the transmit terminal fiber 32 at the oblique surface of the fiber holder 23, collimated by the rod lens 24, and is transferred to the wavelength selection filter 40. A portion of the collimated light passes through the wavelength selection filter 40 and is converged by the rod lens 24. The converged light is transferred to the line terminal fiber 21 held by the fiber holder 23, which is multiplexed with the light reflected by the wavelength selection filter 40 and is outputted.

In the optical multi/demultiplexer 10 according to the present invention, the inner holder 25 and the outer holder 50 are formed from a glass having a low thermal expansion coefficient, so that displacement of the component elements due to environmental temperature change can be prevented. Therefore, it can perform multi/demultiplexing of light in a stable manner.

Other embodiments of the present invention will be explained hereinafter. In the following, the same arrangement as described above will be designated by the same numeral and the detailed explanation thereof will be omitted.

Figure 7:
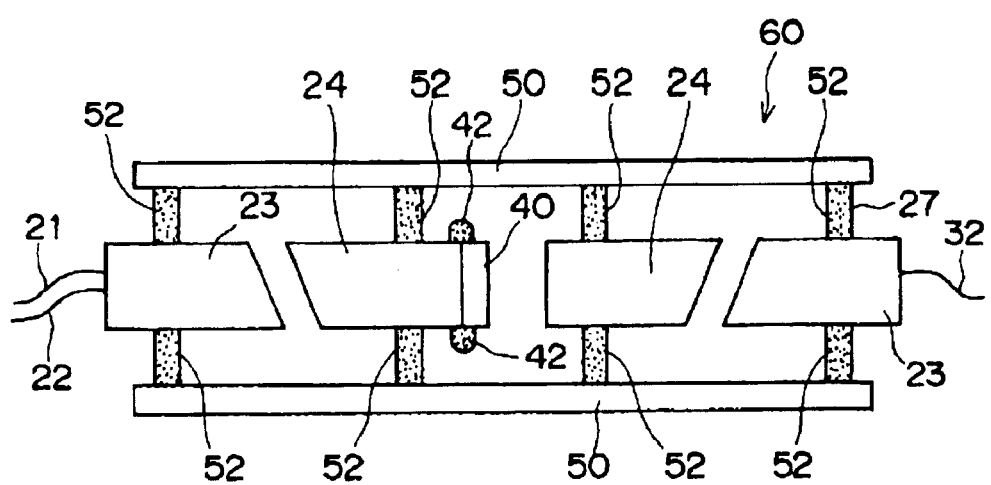
FIG. 7 is a cross-sectional view schematically showing another embodiment of the optical multi/demultiplexer according to the present invention.

FIG. 7 shows an optical multi/demultiplexer according to a second embodiment of the present invention. The optical multi/demultiplexer 60 comprises: a fiber holder 23 for holding a line terminal fiber 21 and a reflection terminal fiber 22 therein; two rod lenses 24, 24; a fiber holder 23 for holding a transmit terminal fiber 32 therein; and an outer holder 50 for holding the two fiber holders 23, 23 and two rod lenses 24, 24 by fixing them on the inner surface thereof with an adhesive 52.

In the above-described optical multi/demultiplexer 60, because the outer holder 50 is made of a glass, a tuning operation can be performed while observing through the outer holder 50 to some extent, so that an easy and time saving alignment operation is possible while preventing collision between component elements. This arrangement also enables use of photo-curing resins as the adhesive 52 which can be cured by radiating light from an outer light source. Thus, bonding operation can be performed in a short time without a heat treatment for the optical components.

Also, since the outer holder 50 is formed from a glass having a low thermal expansion coefficient, displacement of the component elements due to environmental temperature change can be prevented. Therefore, it can perform multi/demultiplexing of light in a stable manner. In addition, by using a low thermal expansion adhesive 52, undesirable effects due to environmental temperature change can be further reduced. Thus, an optical multi/demultiplexer which is easy to manufacture and has a high multi/demultiplexing efficiency and a high reliability can be presented.

Next, an optical signal separating device and an optical signal merging device using the above-described optical multi/demultiplexer 10, 60 will be explained. This optical signal separating device and optical signal merging device comprises plural optical multi/demultiplexers, each optical multi/demultiplexer having a wavelength selection filter with a different waveband transmissive property.

Figure 8:
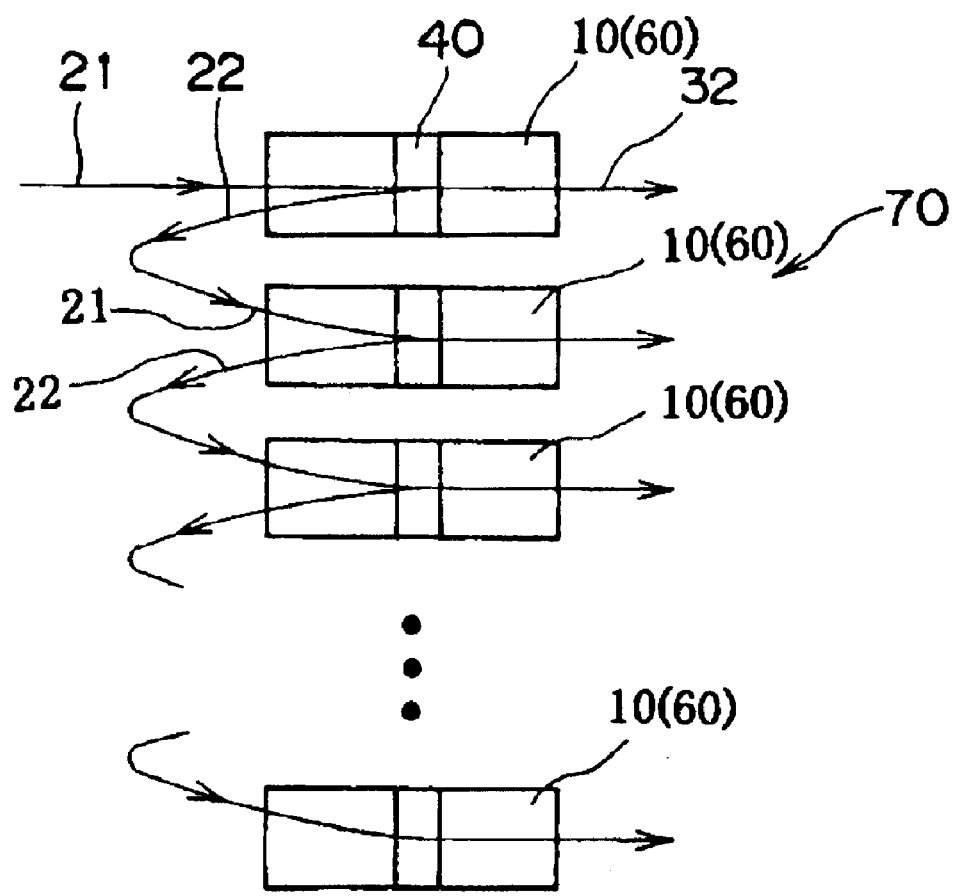
FIG. 8 is a cross-sectional view schematically showing an optical signal separating device according to the present invention.

FIG. 8 shows the optical signal separating device. In the optical signal separating device 70, a reflection terminal fiber 22 of the first optical multi/demultiplexer 10, 60 is connected to a line terminal fiber 21 of the second optical multi/demultiplexer 10, 60, and a reflection terminal fiber 22 of the second optical multi/demultiplexer 10, 60 is connected to a line terminal fiber 21 of the third optical multi/demultiplexer 10, 60, and so on. That is, a reflection terminal fiber 22 of a foregoing optical multi/demultiplexer 10, 60 is connected to a line terminal fiber 21 of a following optical multi/demultiplexer 10, 60 in series. Such an arrangement enables each of the optical multi/demultiplexer 10, 60 to output light of an individual waveband separated from inputted light including plural wavebands, and introduced from the line terminal fiber 21 of the first optical multi/demultiplexer 10, 60.

Figure 9:
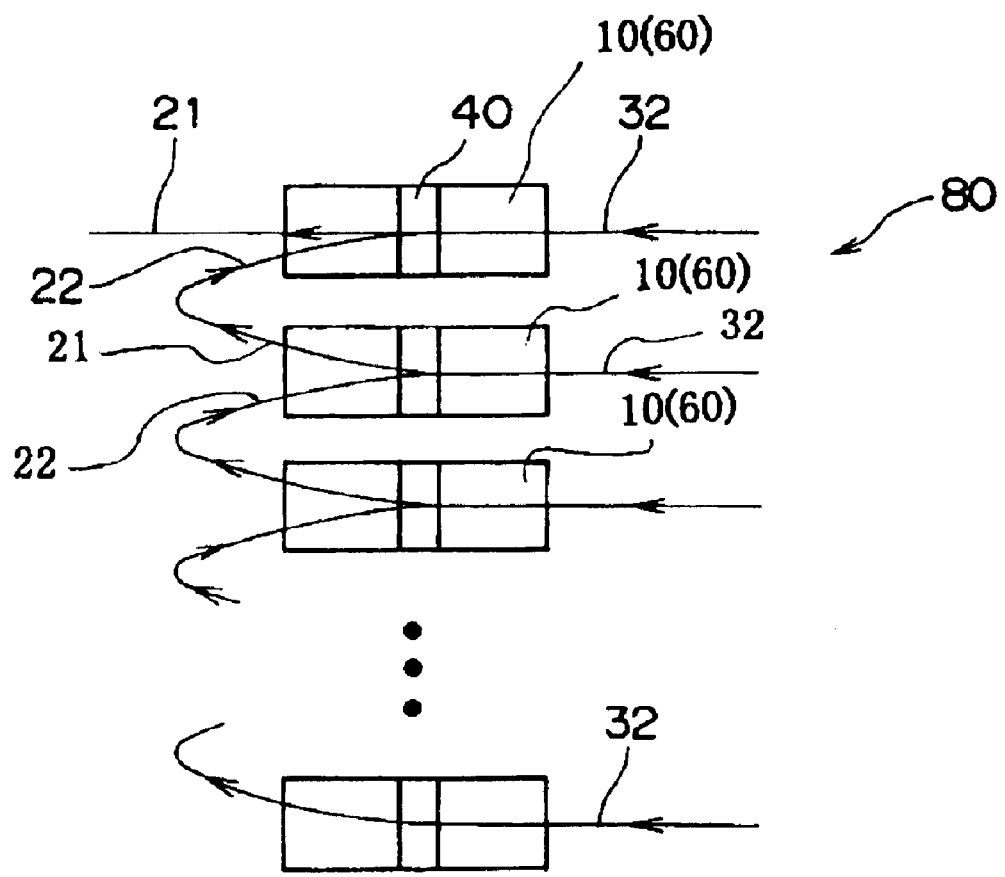
FIG. 9 is a cross-sectional view schematically showing an optical signal merging device according to the present invention.

FIG. 9 shows an optical signal merging device. In the optical signal merging device 80, a line terminal fiber 21 of the second optical multi/demultiplexer 10, 60 is connected to a reflection terminal fiber 22 of the first optical multi/demultiplexer 10, 60, and a line terminal fiber 21 of the third optical multi/demultiplexer 10, 60 is connected to a reflection terminal fiber 22 of the second optical multi/demultiplexer 10, 60, and so on. That is, a line terminal fiber 21 of a following optical multi/demultiplexer 10, 60 is connected to a reflection terminal fiber 22 of a foregoing optical multi/demultiplexer 10, 60 in series. In such an arrangement, by introducing respective inputted light having respective wavelength properties from respective transmit terminal fibers 32, multiplexed light of those respective inputted light can be produced from the line terminal fiber 21 of the first optical multi/demultiplexer.

Next, an optical equalizer using the above-described optical multi/demultiplexer 10, 60 will be explained. The optical equalizer is used, when an optical signal is amplified and the gain of the amplified optical signal is not uniform with reference to the wavelength, so as to equalize such gain.

Figure 10:
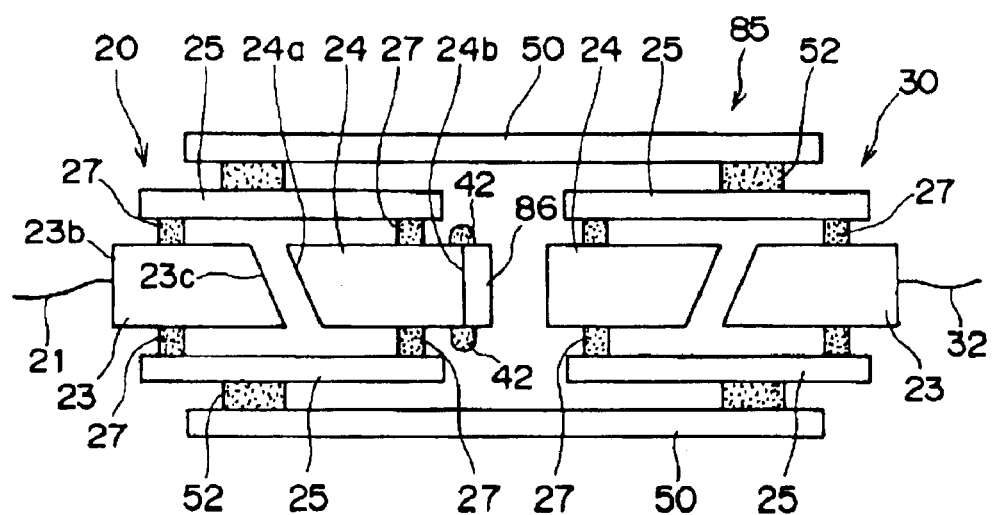
FIG. 10 is a cross-sectional view schematically showing an optical equalizer according to the present invention.
Figure 11:
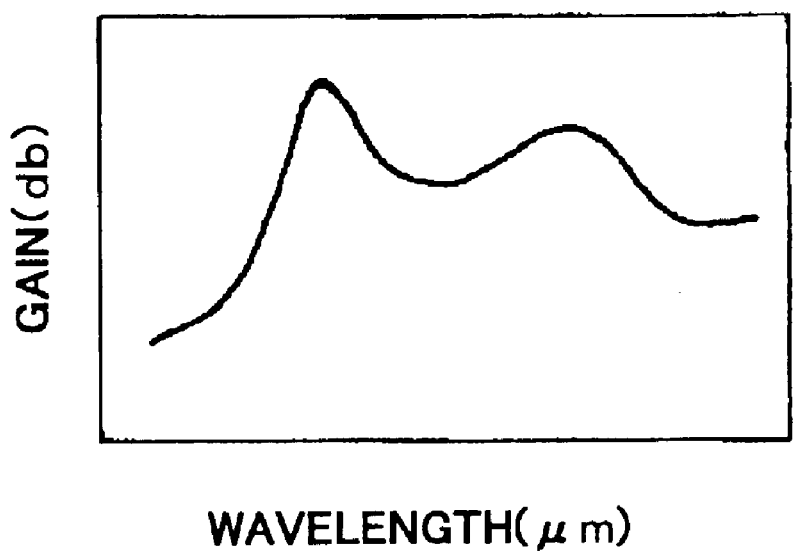
FIG. 11 is a graph showing a gain characteristic curve of an optical signal to be equalized.
Figure 12:
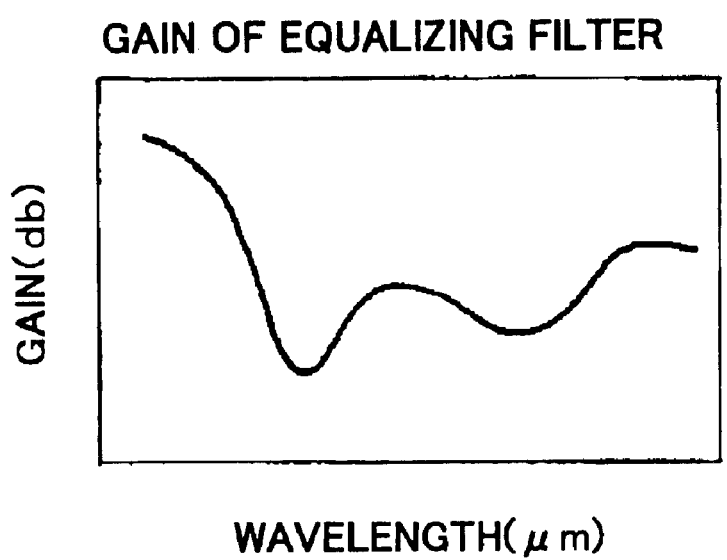
FIG. 12 is a graph showing a gain characteristic curve for the equalization filter.
Figure 13:
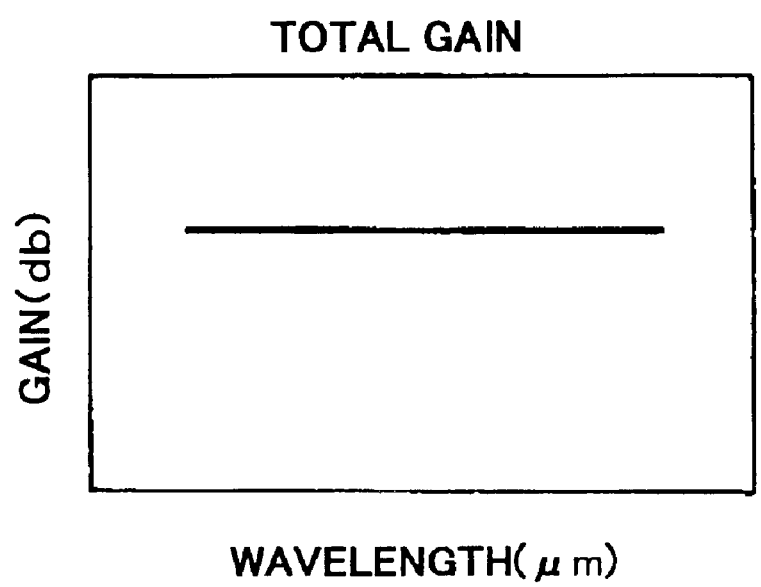
FIG. 13 is a graph showing a gain characteristic curve of an equalized optical signal.

FIG. 10 shows the optical equalizer according to the present invention. In a first collimator 20 as a first optical system of the optical equalizer 85, a line terminal fiber 21 is provided for guiding the signal light to be equalized. Also, an equalization filter 86 is provided on the perpendicular surface 24b of the rod lens 24 of the first collimator 20 for performing equalization of the transmitted signal light. The equalization filter 86 usually has a gain characteristic curve complementary or reversely shaped relative to that of an optical amplifier. For example, when equalizing light having a gain characteristic curve shown in FIG. 11 is outputted from the optical amplifier to have a curve shown in FIG. 13, an equalization filter 86 having a gain characteristic curve shown in FIG. 12 is used. A dielectric multilayer filter can be used as the equalization filter 86 similarly as in the case of the wavelength selection filter 40. Wavelength selectivity of the dielectric multilayer filter can be optimized by adjusting parameters such as thickness of the layers.

In the above-described optical equalizer, light amplified by the optical amplifier is guided to the optical equalizer 85 by way of the line terminal fiber 21. The light is emitted from an end of the line terminal fiber at the oblique surface 23c, collimated by the rod lens 24, and introduced to the equalization filter 86. Gain of the light is equalized while it passes through the equalization filter 86. The light after passing through the equalization filter 86 is converged by the rod lens 24 and is guided to the transmit terminal fiber 32 held by the fiber holder 23 to be outputted. Thus, the present invention can provide an optical equalizer having easy alignment and stable tuning characteristics and long term use reliability by avoiding displacement.

The above-described optical equalizer 85 has adopted a basic configuration of the optical multi/demultiplexer 10 shown in FIG. 1, however, a basic configuration of optical multi/demultiplexer 60 shown in FIG. 7 is also applicable.

Figure 14:
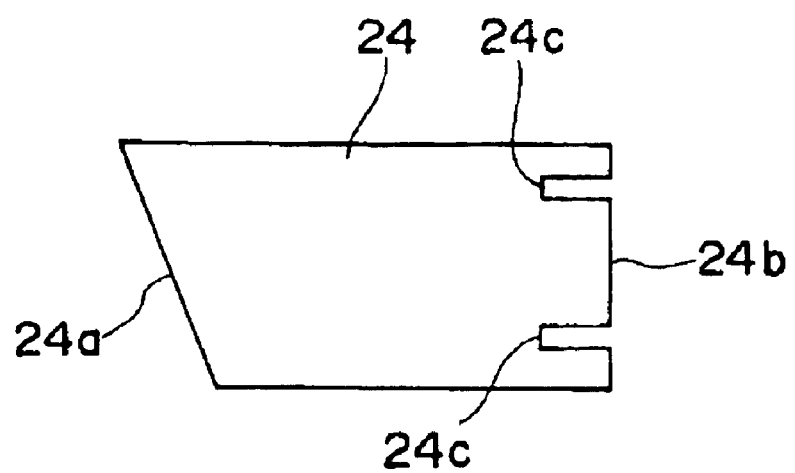
FIG. 14 is a cross-sectional view showing another embodiment of the rod lens.

Another embodiment having a modified configuration of the above-described optical filtering module will be explained. FIG. 14 shows a rod lens 24 for use in a modified embodiment for the above-described optical multi/ demultiplexers 10, 60 or optical equalizer 85. This rod lens 24 is formed with a groove section 24c on its perpendicular surface 24b. The groove section 24c is for preventing the adhesive 42 infiltrated into a gap between the mating surfaces of the rod lens 24 and the wavelength selection filter 40 or equalization filter 86 from further entering the central region forming an optical path. In the embodiment, the groove section 24c receives and reserves therein the infiltrated adhesive, and can be formed in a lattice or triangle shape surrounding the optical path.

Figure 15:
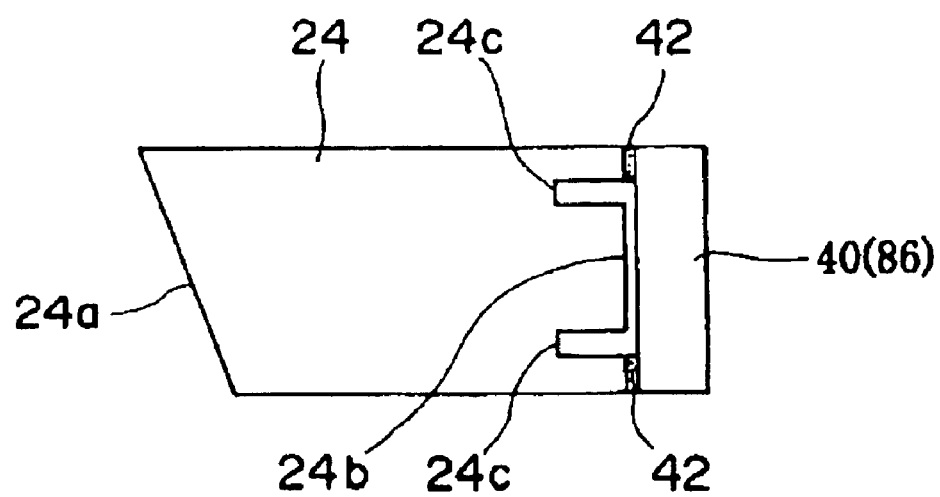
FIG. 15 is a cross-sectional view showing the process for securing the rod lens to the wavelength selection filter.
Figure 16:
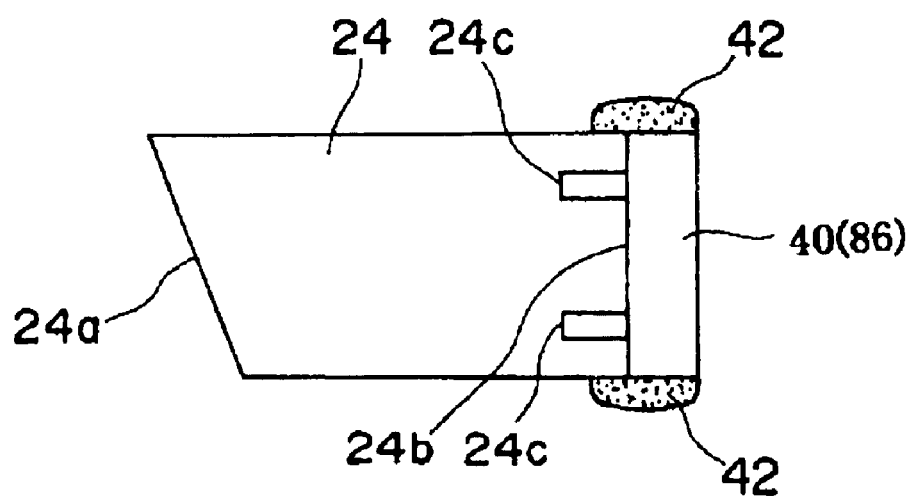
FIG. 16 is a cross-sectional view showing another process for securing the rod lens to the wavelength selection filter.

The filter 40, 86 is fixed on the rod lens 24 with adhesive 42 coated on the area outside the groove section 24c of the perpendicular surface 24b, as shown in FIG. 15, or, with adhesive 42 coated on the outer surface of the rod lens 24 and the filter 40, 86 as shown in FIG. 16. Also, the groove section can be formed on the mating surface of the wavelength selection filter 40.

Figure 17:
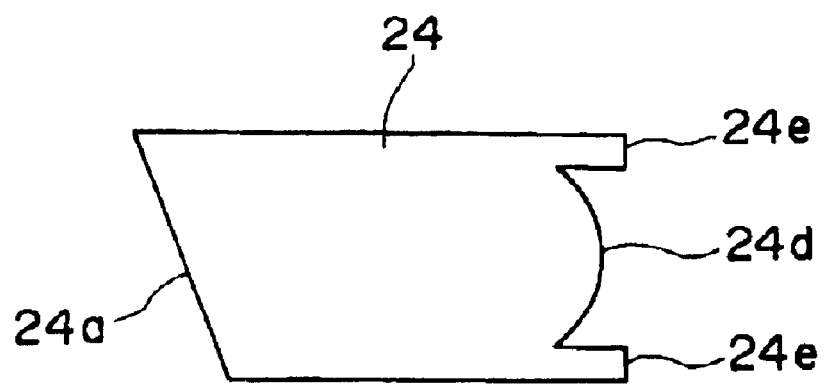
FIG. 17 is a cross-sectional view showing another embodiment of the rod lens.

FIG. 17 shows a rod lens 24 used in another modified embodiment of the optical filtering module. The rod lens 24 is formed, on a surface opposite to the oblique surface 24a, with a protrusion 24d having a spherical or non-spherical surface for collimating or converging light. A refractive index gradient is not formed in this rod lens 24. A flat section 24e is formed at the outer periphery around the protrusion 24d so as to project in a longitudinal direction. Height of the flat section 24e is usually equal to or larger than the that of the protrusion 24d. A recess is formed between the protrusion 24d and the flat section 24e for reserving the adhesive infiltrated into the gap between the mated surfaces of the rod lens 24 and the filter.

Figure 18:
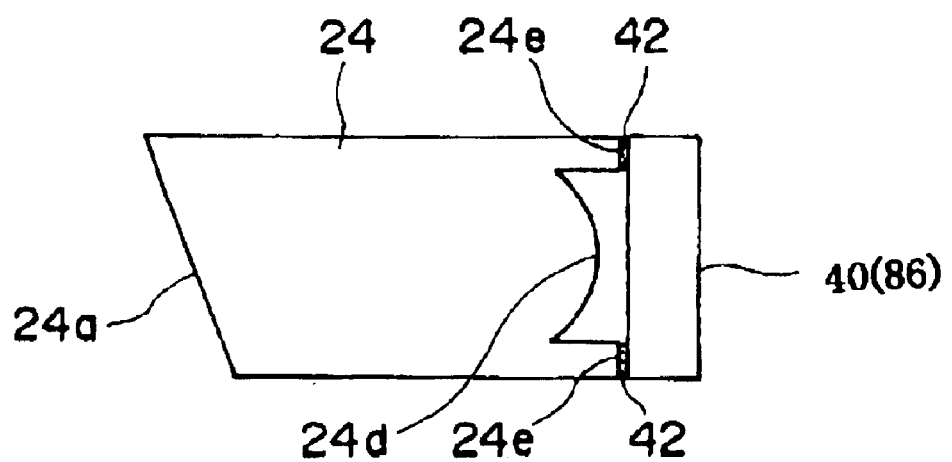
FIG. 18 is a cross-sectional view showing another process for securing the rod lens to the wavelength selection filter.
Figure 19:
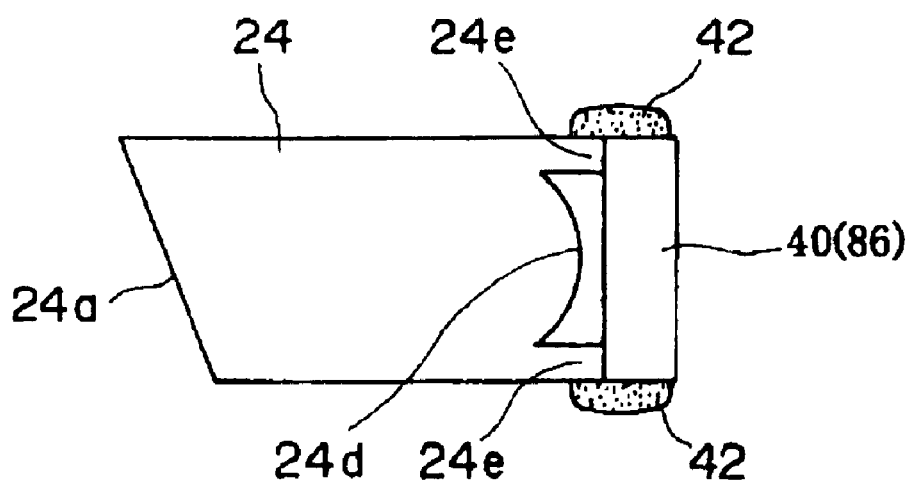
FIG. 19 is a cross-sectional view showing still another process for securing the rod lens to the wavelength selection filter.

Here, the filters 40, 86 are fixed on the rod lens 40 with an adhesive coated on the area outside the protrusion 24d, as shown in FIG. 18, or, with an adhesive 42 coated on the outer surface of the rod lens 24 and filter 40, 86 as shown in FIG. 19.

Such an arrangement of the rod lens 24 prevents the adhesive infiltrated into the gap between the mated surfaces of the rod lens 24 and the wavelength selection filter from reaching the central region thereof and forming an optical path to thereby block the same.

The present invention is not limited to the above-described embodiments, and can be modified according to the individual application. For example, the optical filtering module according to the present invention is usable, not only as an optical multi/demultiplexer or an optical equalizer, but as an optical branching module for branching light by allowing a certain portion of the light passing therethrough and reflecting the remaining light. This optical branching module can be used for monitoring light in an optical system. The optical filtering module according to the present invention can be used as a combination of the above-described embodiments.

Hereinafter, the present invention will be further explained by referring to the following examples.

EXAMPLE 1

An optical multi/demultiplexer shown in FIG. 1 was manufactured. A graded index lens (outer diameter: 1.8 mmϕ, length: 4.4 mm) made of a glass having a pitch of 0.23 was used as the rod lens, which comprises an oblique surface polished and inclined by 8 degrees to a surface orthogonal to the optical axis and antireflection films formed on both inclined and perpendicular surfaces. A dielectric multilayer filter type wavelength selection filter for passing light having a mean wavelength of 1550 nm therethrough and reflecting light of other wavelengths was prepared. One end surface of the wavelength selection filter is closely mated to the perpendicular surface of the rod lens. Then, an epoxy-based ultraviolet-curing adhesive was coated on several spots on the outer surface surrounding the mated surfaces and was cured by radiating ultraviolet.

As the line terminal fiber and reflection terminal fiber, a silica-based single mode optical fiber (SMF28(trade name) Corning Incorporated) was used having a cladding diameter of 125 μm, core diameter of 10 μm, of which a primary and secondary sheaths were removed for a certain length (20 mm) at their tip end. These two optical fibers were inserted into a fiber holder made of a borosilicate glass having a cylinder shape (outer diameter: 1.8 mmϕ, length: 11 mm) with a central through hole of a square cross section (214 μm ×214 μm). The optical fibers are fixed by filling the through hole with and curing an epoxy-based thermosetting adhesive. The tip end of the fiber holder is then polished to be inclined by 8 degrees to a surface orthogonal to the optical axis, and is covered with an antireflection film.

The rod lens and the fiber holder was then inserted into an inner holder made of a Pyrex glass (outer diameter: 3 mm, inner diameter: 1.85 mm, thickness: 0.58 mm, length: 8 mm), and the lens and the fiber holder are fixed thereto with an ultraviolet-curing adhesive, to thereby form a first collimator.

On the other hand, the above-described optical fiber was employed as a transmit terminal fiber, which is inserted into a fiber holder made of a borosilicate glass having a cylinder shape with a circular central through hole (outer diameter: 1.8 mmφ, inner diameter: 126 μmφ, length: 6 mm). The optical fiber is fixed by filling the through hole with and curing an epoxy-based thermosetting adhesive. The tip end of the fiber holder is then polished to be inclined by 8 degrees to a surface orthogonal to the optical axis, and is covered with an antireflection film.

The fiber holder and a rod lens identical with the above-described one was inserted into an inner holder identical with the above-described one, which was then fixed with an ultraviolet-curing adhesive to form a second collimator.

Then the first and second collimators were opposingly positioned and inserted into an outer holder (outer diameter: 5 mmφ, inner diameter: 3.40 mmφ, thickness: 0.80 mm, length: 13 mm) made of a Pyrex glass and were tuned. Each collimator was fixed at its outer surface on the inner surface of the outer holder with an epoxy-based ultraviolet-curing adhesive. The thermal expansion coefficient for the above-described inner or outer holder made of Pyrex glass made was about $3 \times 10^{-6}$/K. Thus, an optical multi/demultiplexer shown in FIG. 1 was manufactured.

EXAMPLE 2

A rod lens (outer diameter: 1.8 mmφ, length: 3.4mm) made of a glass having, as shown FIG. 17, a protrusion and a flat section at one end, and an oblique surface polished and inclined by 8 degrees to a surface orthogonal to the optical axis at the other end was employed as a rod lens. The protrusion of the rod lens was formed so that it focuses at an outer region of the end surface.

The flat section of the rod lens is closely mated with the end surface of a wavelength selection filter identical to the one in the Example 1, and an epoxy-based ultraviolet-curing adhesive was coated on several spots on the outer surface surrounding the mated surfaces and was cured by radiating ultraviolet to thereby fix the wavelength selection filter on the rod lens.

By applying the same process as the Example 1 except above, an optical multi/demultiplexer was manufactured.

Comparative Example

An optical multi/demultiplexer as a comparative example was manufactured in the following manner. Optical fibers identical with the above Examples were prepared. Optical fiber holders having a circular cross section through hole with an inner diameter of 252 μm and graded index lenses with 0.25 pitch were prepared. The oblique surfaces of the optical fiber holders were respectively mated with polished surfaces of the graded index lenses and these were bonded at the outer surface thereof with a thermosetting adhesive.

The bonded structures were then inserted into respective stainless steel (SUS) pipes plated with gold (inner diameter: 2.7 mmφ, outer diameter: 3.2 mmφ, thickness: 0.255 mm), and the inner surface of the pipe and the outer surfaces of the optical fiber holders were bonded by a thermosetting adhesive to thereby form first and second collimators.

Figure 20:
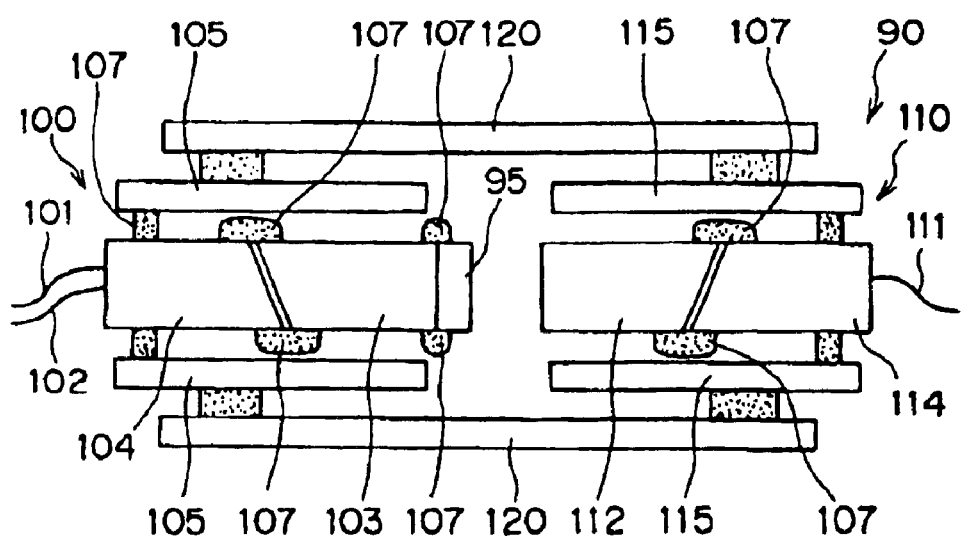
FIG. 20 is a cross-sectional view showing a conventional optical multi/demultiplexer.

The first and second collimators were inserted into a stainless steel (SUS) pipe plated with gold (inner diameter: 3.5 mmφ, outer diameter: 4.5 mmφ, thickness: 0.5 mm), and tuned. The inner surface of the pipe and the outer surfaces of the first and second collimators were bonded together by soldering thereby forming an optical multi/demultiplexer shown in FIG. 20.

Environmental Test

An environmental test was conducted on the optical multi/demultiplexers according to the Examples and the Comparative Example. The optical multi/demultiplexers were disposed in a condition where a temperature range of from −40° C. to 85° C. was provided by virtue of an environmental testing device. Insertion loss between the line terminal fiber to transmit terminal fiber was measured at a time interval.

An 8 hour cycle for temperature change of the device included the steps of, maintaining at 20° C. for 1 hour, raising to 85° C. by 1 hour, maintaining at 85° C. for 1 hour, lowering to 20° C. by 1 hour, maintaining at 20° C. for 1 hour, lowering to −40° C. by 1 hour, maintaining at −40° C. for 1 hour, raising to 20° C. by 1 hour. Insertion loss was measured in every 10 minutes in both 10 cycle and 50 cycle tests for Examples and Comparative Example. The insertion loss is represented by a maximum variation where the insertion loss for the optical multi/demultiplexer prior to the environmental test is set as 0 dB. The results are shown in Table 1.

TABLE 1

| | Maximum variation of insertion loss in a 10 cycle test (dB) | Maximum variation of insertion loss in a 50 cycle test (dB) |
|---|---|---|
| EXAMPLE 1 | 0.30 | 0.30 |
| EXAMPLE 2 | 0.30 | 0.30 |
| COMPARATIVE EXAMPLE | 0.77 | 0.82 |

Table 1 shows that the optical multi/demultiplexers according to the Examples exhibit less amount of insertion loss in a temperature cycle test with reference to the Comparative Example.

According to the present invention, an optical filtering module is provided which is easy to manufacture, exhibits less deterioration under circumstances of changing a temperature, and has a high reliability for a long term use. Also, the optical filtering module can be used to provide various optical devices such as an optical multi/demultiplexer or an optical equalizer having the same advantages as above.

What is claimed is:

1. An optical filtering module comprising:
   an optical filter for at least one of transmitting, attenuating and reflecting light having a certain wavelength range,
   a first optical system having an optical fiber for guiding light to be transferred to said optical filter,
   a second optical system having an optical fiber for guiding light transferred from said optical filter, said second optical system being opposingly arranged to said first optical system while interposing said optical filter therebetween, and
   an outer cylindrically shaped glass holder for holding therein said optical filter, said first optical system and said second optical system secured thereto,
   wherein each of said first and second optical systems comprises a lens optically connecting said optical fiber and said optical filter respectively, said optical filter being secured to one of said lenses of said first and second optical systems,
   each of said first and second optical systems comprises an optical fiber holder having a through hole for receiving said optical fiber inserted therein,
   each of said first and second optical systems comprises an inner holder for holding said optical fiber holder and said lens, said inner holders being secured to said outer holder with a photo-curing adhesive, and said optical fiber holder and lens are each directly secured to said inner holder.

2. The optical filtering module according to claim 1, wherein said inner holder is made of a glass.

3. An optical multi/demultiplexer comprising:
a wavelength selection filter for selectively transmitting light of a certain wavelength range and reflecting light of other wavelength ranges,
a first optical system having an optical fiber for guiding light to be transferred to said wavelength selection filter and an optical fiber for guiding light to be transferred from said wavelength selection filter,
a second optical system having an optical fiber for guiding light transferred to or from said wavelength selection filter, said second optical system being opposingly arranged to said first optical system while interposing said wavelength selection filter therebetween, and
an outer cylindrically shaped glass holder, said outer holder being adapted to hold therein said wavelength selection filter said first optical system and said second optical system secured thereto,
wherein each of said first and second optical systems comprises a lens optically connecting said optical fiber and said wavelength selection filter respectively, said wavelength selection filter being secured to one of said lenses of said first and second optical systems,
each of said first and second optical systems comprises an optical fiber holder having a through hole for receiving said optical fiber inserted therein,
each of said first and second optical systems comprises an inner holder for holding said optical fiber holder and said lens, said inner holders being secured to said outer holder with a photo-curing adhesive, and
said optical fiber holder and lens are each directly secured to said inner holder.

4. The optical multi/demultiplexer according to claim 3, wherein said optical fiber holder of said first optical system has the through hole rectangularly formed for receiving both of said optical fibers for guiding light transferred to and from said wavelength selection filter.

5. The optical multi/demultiplexer according to claim 3, wherein said optical fiber holder is made of a glass.

6. The optical multi/demultiplexer according to claim 3, wherein said inner holder is made of a glass.

7. The optical multi/demultiplexer according to claim 3, wherein said lenses of said first and second optical systems are graded index lenses having a pitch not less than 0.2 and not larger than 0.25.

8. An optical signal separating device comprising a plurality of optical multi/demultiplexers, each of said optical multi/demultiplexers comprising:
a wavelength selection filter for selectively transmitting light of a certain wavelength range and reflecting light of other wavelength ranges,
a first optical system having an optical fiber for guiding light to be transferred to said wavelength selection filter,
a second optical system having an optical fiber for guiding light transferred to or from said wavelength selection filter, said second optical system being opposingly arranged to said first optical system while interposing said wavelength selection filter therebetween, and
an outer cylindrically shaped glass holder, said outer holder being adapted to hold therein said wavelength selection filter, said first optical system and said second optical system secured thereto,
wherein each of said first and second optical systems comprises a lens optically connecting said optical fiber and said wavelength selection filter respectively, said wavelength selection filter being secured to one of said lenses of said first and second optical systems,
each of said first and second optical systems comprises an optical fiber holder having a through hole for receiving said optical fiber inserted therein,
each of said first and second optical systems comprises an inner holder for holding said optical fiber holder and said lens, said inner holders being secured to said outer holder with a photo-curing adhesive,
said optical fiber holder and lens are each directly secured to said inner holder, and
said plurality of optical multi/demultiplexer are sequentially connected in series so as to connect an optical fiber for guiding light to be transferred from said wavelength selection filter of said first optical system of a preceding sequentially connected optical multi/demultiplexer to an optical fiber for guiding light to be transferred to said wavelength selection filter of said first optical system of a following sequentially connected optical multi/demultiplexer, to thereby sequently separate light of a certain bandwidth from an inputted light signal including light of different wavelengths and output said light of said certain bandwidth from said optical fiber of said second optical system.

9. An optical signal merging device comprising a plurality of optical multi/demultiplexers, each of said optical multi/demultiplexers comprising:
a wavelength selection filter for selectively transmitting light of a certain wavelength range and reflecting light of other wavelengths,
a first optical system having an optical fiber for guiding light to be transferred to said wavelength selection filter,
a second optical system having an optical fiber for guiding light transferred to or from said wavelength selection filter, said second optical system being opposingly arranged to said first optical system while interposing said wavelength selection filter therebetween, and
an outer cylindrically shaped glass holder, said outer holder being adapted to hold therein said wavelength selection filter said first optical system and said second optical system secured thereto,
wherein each of said first and second optical systems comprises a lens optically connecting said optical fiber and said wavelength selection filter respectively, said wavelength selection filter being secured to one of said lenses of said first and second optical systems,
each of said first and second optical systems comprises an optical fiber holder having a through hole for receiving said optical fiber inserted therein,
each of said first and second optical systems comprises an inner holder for holding said optical fiber holder and said lens, said inner holders being secured to said outer holder with a photo-curing adhesive,
said optical fiber holder and lens are each directly secured to said inner holder, and
said plurality of optical multi/demultiplexers are sequently connected in series so as to connect an optical fiber for guiding light to be transferred to said wavelength selection filter of said first optical system of a preceding sequentially connected optical multi/demultiplexer to an optical fiber for guiding light to be transferred from said wavelength selection filter of said first optical system of a following sequentially connected optical multi/demultiplexer, to thereby sequently merge light of a certain bandwidth inputted from said second optical system and transmitted through said wavelength selection filter.

10. An optical equalizer comprising:

a first optical system having an optical fiber for guiding light to be equalized, an equalization filter for equalizing light introduced through an optical fiber of said first optical system, a second optical system for guiding light having passed through said equalization filter, said second optical system being opposingly arranged to said first optical system while interposing said equalization filter therebetween, and an outer cylindrically shaped glass holder for holding therein said equalization filter, said first optical system and said second optical system secured thereto, wherein each of said first and second optical systems comprises a lens optically connecting said optical fiber and said wavelength selection filter respectively, said wavelength selection filter being secured to one of said lenses of said first and second optical systems, each of said first and second optical systems comprises an optical fiber holder having a through hole for receiving said optical fiber inserted therein, each of said first and second optical systems comprises an inner holder for holding said optical fiber holder and said lens, said inner holders being secured to said outer holder with a photo-curing adhesive, and said optical fiber holder and lens are each directly secured to said inner holder.

11. The optical equalizer according to claim 10, wherein said optical fiber holder is made of a glass.

12. The optical equalizer according to claim 10, wherein said inner holder is made of a glass.

13. The optical equalizer according to claim 10, wherein said lenses of said first and second optical systems are graded index lenses having a pitch not less than 0.2 and not larger than 0.25.

* * * * *